United States Patent
Koob et al.

(10) Patent No.: US 7,584,233 B2
(45) Date of Patent: Sep. 1, 2009

(54) SYSTEM AND METHOD OF COUNTING LEADING ZEROS AND COUNTING LEADING ONES IN A DIGITAL SIGNAL PROCESSOR

(75) Inventors: Christopher Edward Koob, Round Rock, TX (US); Jian Liang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 841 days.

(21) Appl. No.: 11/170,288

(22) Filed: Jun. 28, 2005

(65) Prior Publication Data
US 2006/0294175 A1 Dec. 28, 2006

(51) Int. Cl.
*G06F 7/00* (2006.01)

(52) U.S. Cl. .................................. 708/211

(58) Field of Classification Search .............. 708/211
See application file for complete search history.

(56) References Cited

U.S. PATENT DOCUMENTS

| | | | | |
|---|---|---|---|---|
| 4,247,891 A | * | 1/1981 | Flynn et al. | 712/223 |
| 5,752,069 A | * | 5/1998 | Roberts et al. | 712/23 |
| 5,787,025 A | * | 7/1998 | Muwafi et al. | 708/490 |
| 5,831,877 A | * | 11/1998 | Thomson | 708/200 |
| 5,844,826 A | | 12/1998 | Nguyen | |
| 6,654,776 B1 | | 11/2003 | Ott et al. | |
| 6,757,820 B2 | * | 6/2004 | Sudharsanan et al. | 712/300 |
| 6,779,008 B1 | | 8/2004 | Erle et al. | |

FOREIGN PATENT DOCUMENTS

| WO | 9732249 | 9/1997 |
|---|---|---|
| WO | 0137083 | 5/2001 |

OTHER PUBLICATIONS

Hedley Francis: "ARM DSP-Enhanced Extensions" ARM White Paper, May 2001, pp. 1-7, XP009075203.
International Preliminary Report on Patentability-PCT/US06/025300, The International Bureau of WIPO, Geneva Switzerland-Jan. 9, 2008.
International Search Report-PCT/US06/025300, International Search Authority-European Patent Office-Nov. 30, 2006.
Written Opinion-PCT/US06/025300, International Search Authority-European Patent Office-Nov. 30, 2006.

* cited by examiner

*Primary Examiner*—David H Malzahn
(74) *Attorney, Agent, or Firm*—Nicholas J. Pauley; Peter M. Kamarchik; Sam Talpalatsky

(57) ABSTRACT

A system and method is disclosed and includes an execution unit that can be used to count the leading zeros in a data word. During operation, the execution unit can receive a data word that has a width of 2 to the Nth power. Further, the execution unit can sign extend the data word to a temporary data word that has a width of 2 to the Mth power, wherein M is greater than N. The temporary data word can be input to a counter that has a width of 2 to the Mth power and the counter can count the leading zeros within the temporary data word to get a result.

39 Claims, 12 Drawing Sheets

SYSTEM AND METHOD OF COUNTING LEADING ZEROS AND COUNTING LEADING ONES IN A DIGITAL SIGNAL PROCESSOR

BACKGROUND

I. Field

The present disclosure generally relates to digital signal processors and devices that use such processors. More particularly, the disclosure relates to components within a digital signal processor that count leading zeros or count leading ones within data words.

II. Description of Related Art

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

Some of the programs that provide the functionality of the different devices incorporated within a wireless telephone include instructions that call for a leading zeros count or a leading ones count for particular data words. Typically, multiple data word sizes are used with different programs. As such, multiple hardware components can be used to count the leading zeros and leading ones within the different data words.

Accordingly it would be advantageous to provide an improved system and method for counting leading zeros and counting leading ones within a digital signal processor.

SUMMARY

A method of processing a data word is disclosed and includes receiving the data word and determining whether the data word is a thirty-two bit data word or a sixty-four bit data word. Moreover, the method includes sign extending the thirty-two bit data word to create a temporary sixty-four bit data word after determining that the data word is a thirty-two bit data word.

In a particular embodiment, the method can include determining whether a leading zeros value or a leading ones value is to be determined. Also, in a particular embodiment, the method can include communicating the temporary sixty-four bit data word to a bit counter having width of sixty-four bits after determining that the leading zeros value is to be determined. Further, in a particular embodiment, the method can include counting the leading zeros within the temporary sixty-four bit data word to generate a sign extended leading zeros count, subtracting a fixed value of thirty-two from the sign extended leading zeros count, provided the count is not zero, to generate a determined leading zeros count, and writing the determined leading zeros count to a register.

In another particular embodiment, the method can include inverting the temporary sixty-four bit data word to create an inverted sixty-four bit data word when a leading ones value is to be determined. Also, in a particular embodiment, the method can include communicating the inverted temporary sixty-four bit data word to a bit counter with a width of sixty-four bits, counting the leading zeros within the inverted temporary sixty-four bit data word to generate a sign extended leading ones count, subtracting the fixed value of thirty-two from the sign extended leading ones count, provided the count is not zero, to generate a determined leading ones count, and writing the determined leading ones count to a register.

In yet another particular embodiment, the method can further include determining whether a leading zeros value or a leading ones value is to be used, after determining that the data word is a sixty-four bit data word. Additionally, in a particular embodiment, the method can include communicating the sixty-four bit data word to a bit counter with a width of sixty-four bits after determining that the leading zeros value is to be used, counting the leading zeros within the sixty-four bit data word to generate a determined leading zeros count, and writing the determined leading zeros count to a register.

In still another particular embodiment, the method can include inverting the sixty-four bit data word to create an inverted sixty-four bit data word when a leading ones value is to be used, communicating the inverted sixty-four bit data word to a sixty-four bit counter, counting the leading zeros within the inverted sixty-four bit data word to generate a determined leading ones count, and writing the determined leading ones count to a register.

In another embodiment, a method is disclosed and can include using a bit counter with a width of sixty-four bits to count one or more leading zeros within a thirty-two bit data word.

In yet another embodiment, an instruction execution unit for a digital signal processor is disclosed and can include a control module, a sign extender that is coupled to the control module, an inverter that is coupled to the control module, and a bit counter with a width of sixty-four bits that is coupled to the control module. In this embodiment, the control module can include logic to instruct the bit counter to count leading zeros within one or more thirty-two bit data words received at the instruction execution unit and logic to instruct the sixty-four bit logic counter to count leading zeros within one or more sixty-four bit data words received at the instruction execution unit.

In still another embodiment, a digital signal processor is provided and includes a memory, a sequencer that is responsive to the memory, a register file that is coupled to the memory, and an instruction execution unit that is responsive to the sequencer. In this embodiment, the instruction execution unit can include a control module, a sign extender that is coupled to the control module, an inverter that is coupled to the control module, and a bit counter with a width of sixty-four bits that is coupled to the control module. In this embodiment, the control module can include logic to control the sixty-four bit logic counter to count leading zeros within one or more thirty-two bit data words and logic to control the bit counter with a width of sixty-four bits to count leading zeros within one or more sixty-four bit data words.

In yet still another embodiment, a portable communication device is disclosed and includes a digital signal processor. In this embodiment, the digital signal processor can include a memory, a sequencer that is responsive to the memory, a register file that is coupled to the memory, and an instruction execution unit that is responsive to the sequencer. In this embodiment, the instruction execution unit can include a control module, a sign extender that is coupled to the control module, an inverter that is coupled to the control module, and a bit counter with a width of sixty-four bits that is coupled to the control module. In this embodiment, the control module can include logic to control the sixty-four bit logic counter to count leading zeros within one or more thirty-two bit data words and logic to control the sixty-four bit logic counter to count leading zeros within one or more sixty-four bit data words.

In still yet another embodiment, a processor device is disclosed and includes means for receiving a thirty-two bit data word, means for sign extending the thirty-two bit data word to create a temporary sixty-four bit data word, means for counting the leading zeros within the temporary sixty-four bit data word to obtain an interim leading zeros count, and means for subtracting a value from the interim leading zeros count, provided the count is not zero, to obtain a final leading zeros count.

In another embodiment, a processor device is disclosed and includes means for receiving a thirty-two bit data word, means for sign extending the thirty-two bit data word to create a temporary sixty-four bit data word, means for inverting the temporary sixty-four bit data word to create an inverted temporary sixty-four bit data word, means for counting the leading zeros within the temporary sixty-four bit data word to obtain an interim leading ones count, and means for subtracting a value from the interim leading ones count, provided the count is not zero, to obtain a final leading ones count.

In yet another embodiment, a processor device is disclosed and includes means for receiving a data word, means for determining whether the data word is a thirty-two bit data word or a sixty-four bit data word, and means for sign extending a thirty-two bit data word to create a temporary sixty-four bit data word.

In still another embodiment, a method of processing a data word is disclosed and includes receiving a data word having a width of 2 to the Nth power. The method further includes sign extending the data word to a temporary data word having a width of 2 to the Mth power and inputting the temporary data word to a counter having a width of 2 to the Mth power.

In yet still another embodiment, a processor device is disclosed and includes means for receiving a data word having a width of 2 to the Nth power, means for sign extending the data word to a temporary data word having a width of 2 to the Mth power, and means for inputting the temporary data word to a counter having a width of 2 to the Mth power.

In another embodiment, an audio file player is disclosed and includes a digital signal processor, an audio coder/decoder (CODEC) that is coupled to the digital signal processor, a multimedia card that is coupled to the digital signal processor, and a universal serial bus (USB) port that is coupled to the digital signal processor. In this embodiment, the digital signal processor includes a memory, a sequencer that is responsive to the memory, a register file that is coupled to the memory, and an instruction execution unit that is responsive to the sequencer. The instruction execution unit can include a control module, a sign extender that is coupled to the control module, an inverter that is coupled to the control module, and a sixty-four bit wide bit counter that is also coupled to the control module. In this embodiment, the control module includes logic to control the sixty-four bit wide bit counter to count leading zeros within one or more thirty-two bit data words. Also, the control module can include logic to control the sixty-four bit wide bit counter to count leading zeros within one or more sixty-four bit data words.

An advantage of one or more embodiments disclosed herein can include using the same resource to count leading zeros for different data word sizes.

Another advantage can include using the same resource to count leading ones for different data word sizes.

Still another advantage can include substantially reducing the hardware necessary to count leading zeros and to count leading ones.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

Figure 1:
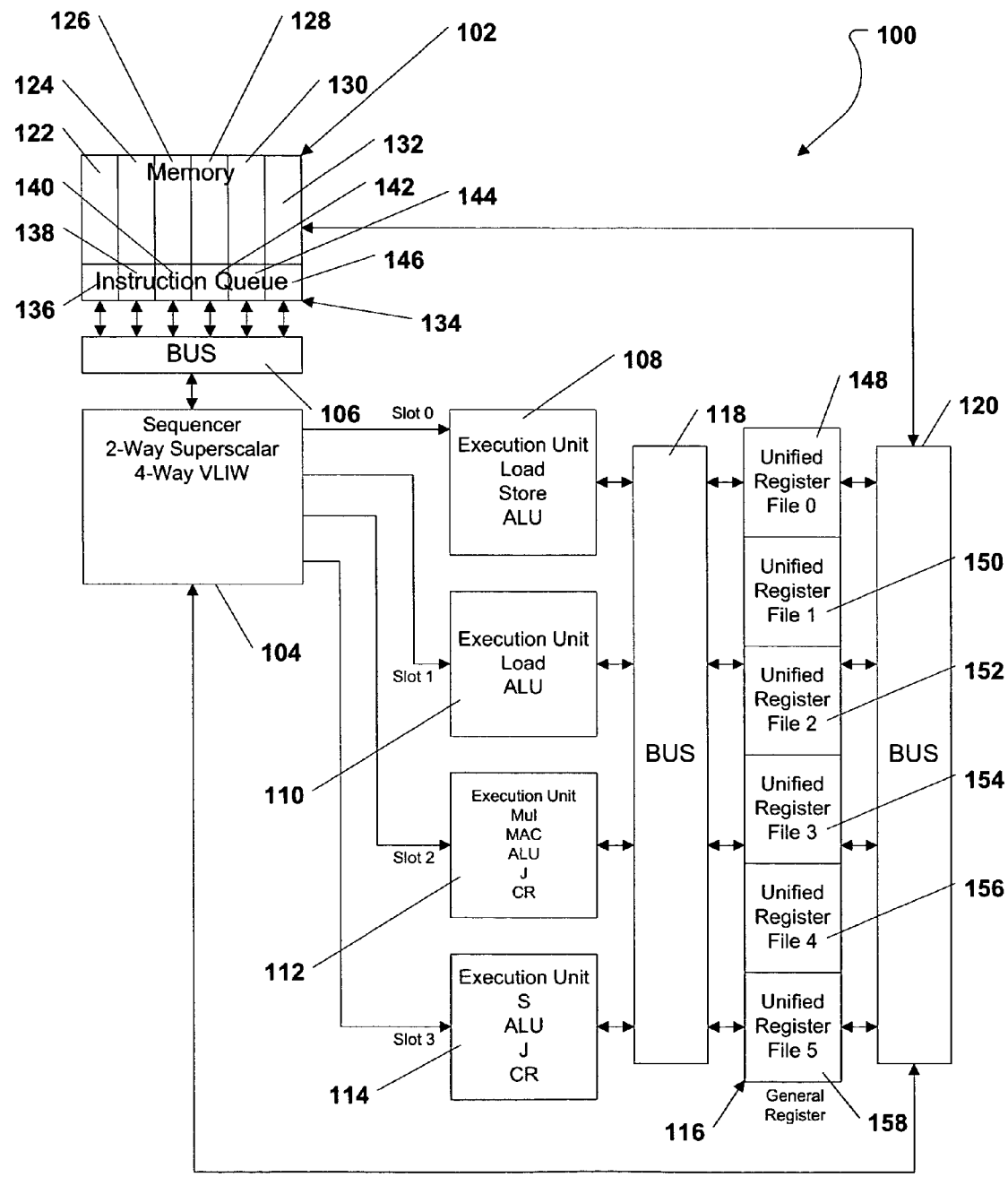
FIG. 1 is a general diagram of an exemplary digital signal processor.

FIG. 1 illustrates a block diagram of an exemplary, non-limiting embodiment of a digital signal processor (DSP) 100. As illustrated in FIG. 1, the DSP 100 includes a memory 102 that is coupled to a sequencer 104 via a first bus 106. As used herein, the word coupled can indicate that two or more components are directly coupled or indirectly coupled. In a particular embodiment, the first bus 106 is a sixty-four (64) bit bus and the sequencer 104 is configured to retrieve instructions from the memory 102 having a length of thirty-two (32) bits or sixty-four (64) bits. The first bus 106 is coupled to a first instruction execution unit 108, a second instruction execution unit 110, a third instruction execution unit 112, and a fourth instruction execution unit 114. FIG. 1 indicates that each instruction execution unit 108, 110, 112, 114 can be coupled to a general register file 116 via a second bus 118. The general register file 116 can also be coupled to the sequencer 104 and the memory 102 via a third bus 120.

In a particular embodiment, the memory 102 includes a first instruction cache 122, a second instruction cache 124, a third instruction cache 126, a fourth instruction cache 128, a fifth instruction cache 130, and a sixth instruction cache 132. During operation, the instruction caches 122, 124, 126, 128, 130, 132 can be accessed independently of each other by the sequencer 104. Additionally, in a particular embodiment, each instruction cache 122, 124, 126, 128, 130, 132 includes a plurality of instructions.

As illustrated in FIG. 1, the memory 102 can include an instruction queue 134 that includes an instruction queue for each instruction cache 122, 124, 126, 128, 130, 132. In particular, the instruction queue 134 includes a first instruction queue 136 that is associated with the first instruction cache 122, a second instruction queue 138 that is associated with the second instruction cache 124, a third instruction queue 140 that is associated with the third instruction cache 126, a fourth instruction queue 142 that is associated with the fourth instruction cache 128, a fifth instruction queue 144 that is associated with the fifth instruction cache 130, and a sixth instruction queue 146 that is associated with the sixth instruction cache 132.

During operation, the sequencer 104 can fetch instructions from each instruction cache 122, 124, 126, 128, 130, 132 via the instruction queue 134. In a particular embodiment, the sequencer 104 fetches instructions from the instruction queues 136, 138, 140, 142, 144, 146 in order from the first instruction queue 136 to the sixth instruction queue 146. After fetching an instruction from the sixth instruction queue 146, the sequencer 104 returns to the first instruction queue 136 and continues fetching instructions from the instruction queues 136, 138, 140, 142, 144, 146 in order.

Figure 2:
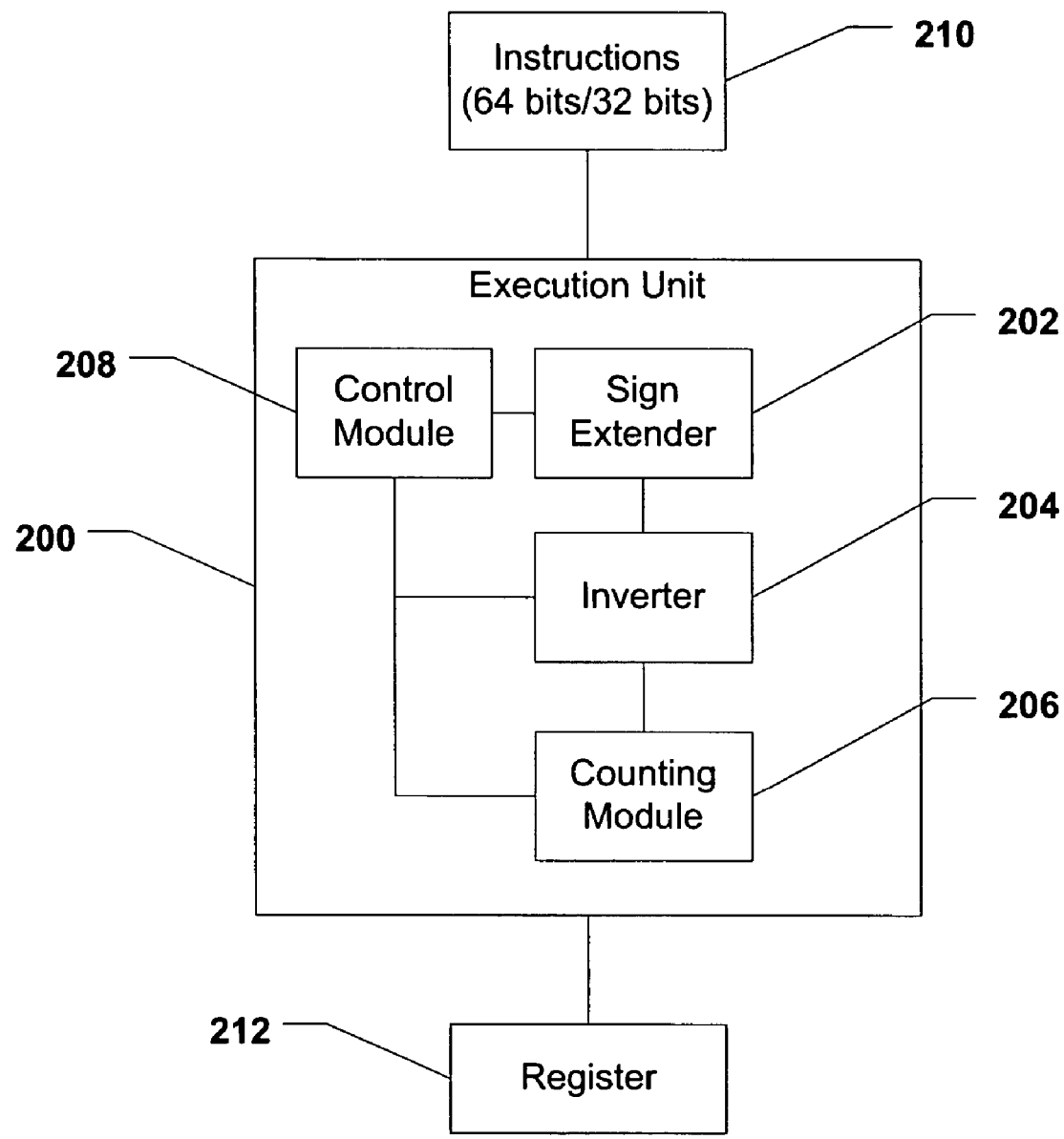
FIG. 2 is a diagram illustrating an exemplary instruction execution unit.

In a particular embodiment, the sequencer 104 operates in a first mode as a 2-way superscalar sequencer that supports superscalar instructions. Further, in a particular embodiment, the sequencer also operates in a second mode that supports very long instruction word (VLIW) instructions. In particular, the sequencer can operate as a 4-way VLIW sequencer. In a particular embodiment, the first instruction execution unit 108 can execute a load instruction, a store instruction, and an arithmetic logic unit (ALU) instruction. The second instruction execution unit 110 can execute a load instruction and an ALU instruction. Also, the third instruction execution unit can execute a multiply instruction, a multiply-accumulate instruction (MAC), an ALU instruction, a program redirect construct, and a transfer register (CR) instruction. FIG. 1 further indicates that the fourth instruction execution unit 114 can execute a shift (S) instruction, an ALU instruction, a program redirect construct, and a CR instruction. FIG. 2 shows details of the components that can be included within the fourth instruction execution unit 114. In a particular embodiment, the program redirect construct can be a zero overhead loop, a branch instruction, a jump (J) instruction, etc.

As depicted in FIG. 1, the general register 116 includes a first unified register file 148, a second unified register file 150, a third unified register file 152, a fourth unified register file 154, a fifth unified register file 156, and a sixth unified register file 158. Each unified register file 148, 150, 152, 154, 156, 158 corresponds to an instruction cache 122, 124, 126, 128, 130, 132 within the memory 102. Further, in a particular embodiment, each unified register file 148, 150, 152, 154, 156, 158 has the same construction and includes a number of data operands and a number of address operands.

During operation of the digital signal processor 100, instructions can be fetched from the memory 102 by the sequencer 104 and operands can be fetched from the unified register files 148, 150, 152, 154, 156 158. Moreover, instructions and operands can be sent to designated instruction execution units 108, 110, 112, 114, and executed at the instruction execution unit 108, 110, 112, 114. Further, one or more operands are retrieved from the general register 116, e.g., one of the unified register files 148, 150, 152, 154, 156, 158 and used during the execution of the instructions. The results at each instruction execution unit 108, 110, 112, 114 can be written to the general register 116, i.e., to one of the unified register files 148, 150, 152, 154, 156, 158.

Referring to FIG. 2, an exemplary, non-limiting embodiment of an instruction execution unit is shown and is generally designated 200. In a particular embodiment, the instruction execution unit 200 can be incorporated into the system 100 shown in FIG. 1. For example, the instruction execution unit 200 can replace the fourth instruction execution unit 114 shown in FIG. 1. As depicted in FIG. 2, the instruction execution unit 200 includes a sign extender 202. Moreover, as shown, an inverter 204 can be coupled to the sign extender 202. Also, a counting module 206 can be coupled to the inverter 204. In a particular embodiment, the counting module 206 includes a sixty-four bit counter.

FIG. 2 also indicates that a control module 208 can be coupled to the sign extender 202, the inverter 204, and the counting module 206. In a particular embodiment, the instruction execution unit 200 can receive a plurality of instructions 210, e.g., sixty-four bit instructions and thirty-two bit instructions. Also, in an illustrative embodiment, the instructions 210 can be stored within one of the instruction queues 136, 138, 140, 142, 144, 144, 146 (FIG. 1) and directed to the execution unit 200 via the sequencer 104 (FIG. 1). Further, the instruction execution unit 200 can write the result of a counting operation performed by the counting module 206 to a register 212. In a particular embodiment, the control module 208 can include logic to perform one or more of the method steps described herein.

Figure 3:
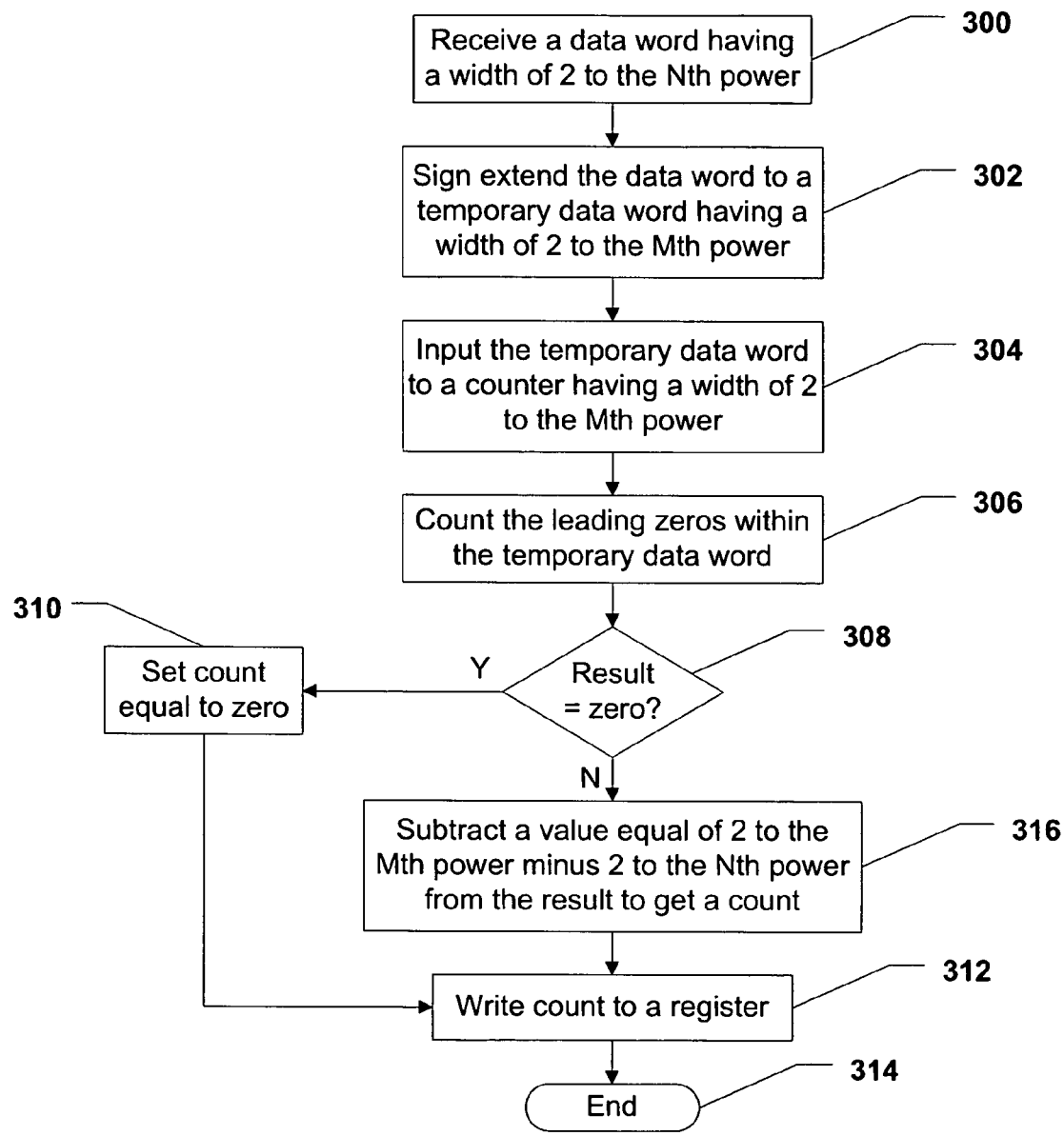
FIG. 3 is a flow chart illustrating a method of counting leading zeros within a data word.

Referring to FIG. 3, a method of counting leading zeros for a data word is shown and commences at block 300. At block 300, an instruction execution unit receives a data word that has a width of 2 to the Nth power. Next, at block 302, a sign extender sign extends the data word to a temporary data word that has a width of 2 to the Mth power. In a particular embodiment, N and M are integers. Further, in a particular embodiment, M is greater than N. Moving to block 304, the sign extender inputs, or otherwise passes, the temporary data word to a counter that has a width of 2 to the Mth power. At block 306, the counter counts the leading zeros within the temporary data word.

Proceeding to decision step 308, the controller determines whether the result from the counter is zero. If so, the method continues to block 310 and the controller sets the count equal to zero. Next, at block 312, the control module writes the count to a register. The method then ends at state 314. Returning to decision step 308, if the result of the count is not zero, the method proceeds to step 316 and a value equal of 2 to the Mth power minus 2 to the Nth power is subtracted from the result to get a count. Moving to block 312, the control module writes the count to a register. The method then ends at state 314.

Figure 4:
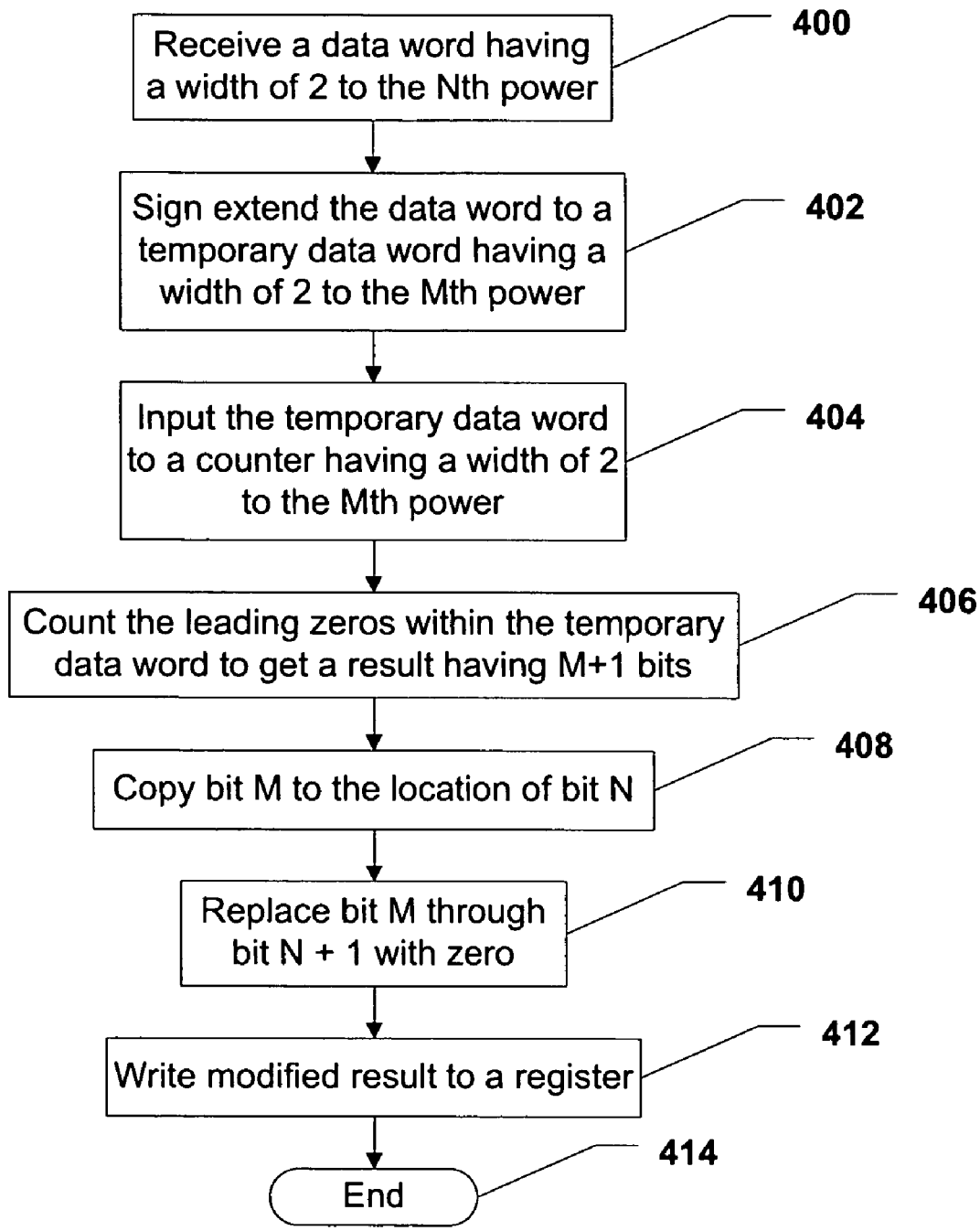
FIG. 4 is a flow chart illustrating another method of counting leading zeros within a data word.

FIG. 4 shows another method of counting leading zeros for a data word. Commencing at block 400, an instruction execution unit receives a data word that has a width of 2 to the Nth power. At block 402, a sign extender sign extends the data word to a temporary data word that has a width of 2 to the Mth power. In a particular embodiment, N and M are integers and M is greater than N. Proceeding to block 404, the sign extender passes, or otherwise inputs, the temporary data word to a counter that has a width of 2 to the Mth power. At block 406, the counter counts the leading zeros within the temporary data word to get a result that includes M+1 bits. In a particular embodiment, the least significant bit in the result is bit zero (0) and the most significant bit in the result is bit M.

Further, bit N lies between the least significant bit and the most significant bit. Continuing to block 408, bit M is copied to the location of bit N. At block 410, bits M through N+1 are replaced with zero. Next, at block 412, the control module writes a modified result to a register. The method then ends at state 414.

Figure 5:
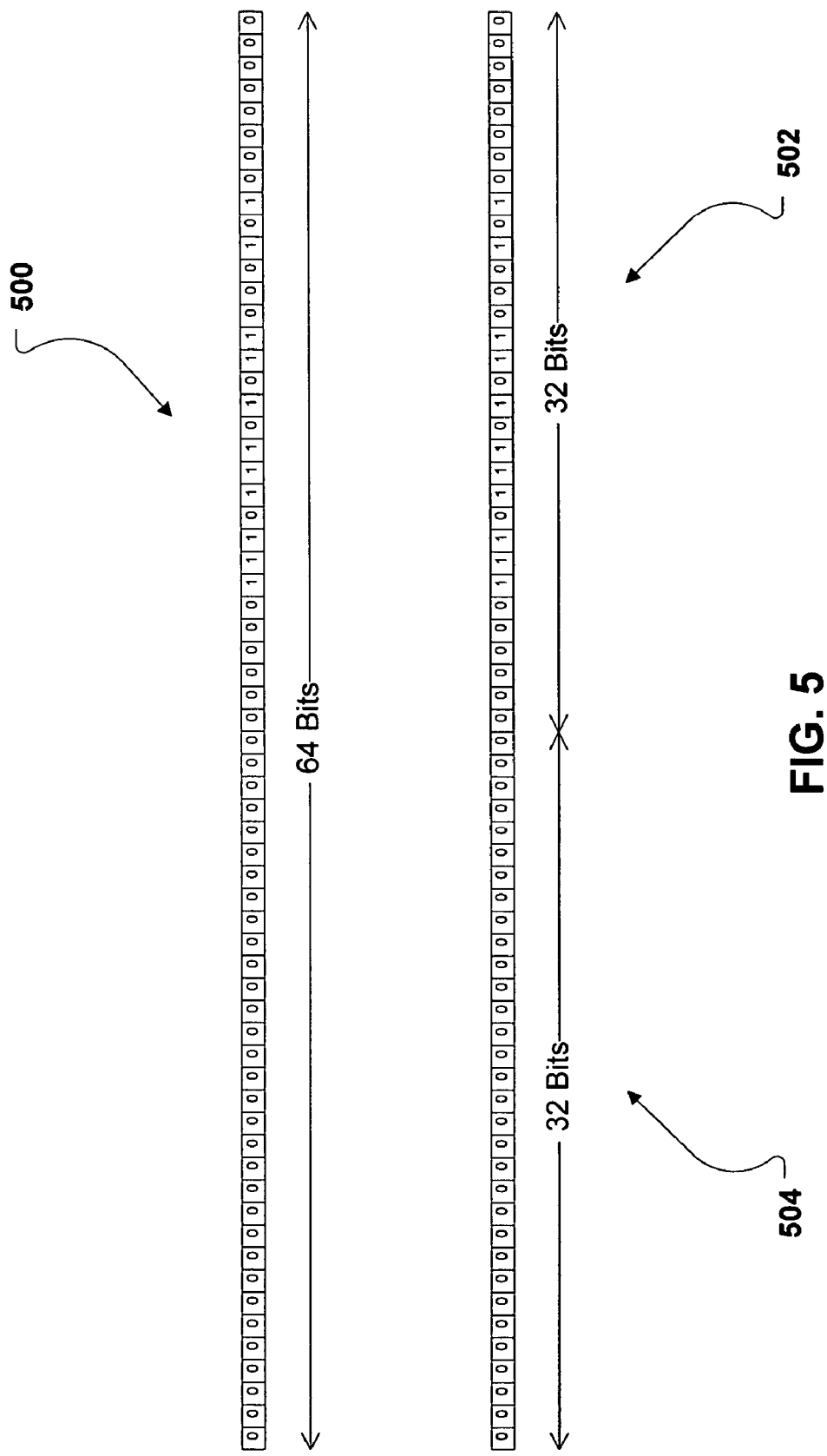
FIG. 5 is a diagram illustrating an exemplary sixty-four bit data word and an exemplary thirty-two bit data word that is sign extended by thirty-two bits.

FIG. 5 illustrates a sixty-four bit data word 500 and a thirty-two bit data word 502. In a particular embodiment, the sixty-four bit data word 500 can be input to a counting module, e.g., the counting module 206 described in conjunction with FIG. 2. The counting module 206 can count the number of leading zeros in the sixty-four bit data word 500. Further, if the instruction requires a count of leading ones within the sixty-four bit data word, the sixty-four bit data word is inverted, and the resulting leading zeros of the inverted sixty-four bit data word are counted by the counting module.

In another embodiment, if an instruction requires a leading zeros or leading ones count for a thirty-two bit data word, then the thirty-two bit data word 502 can be sign extended by thirty-two bits in order to create a sign extended temporary sixty-four bit data word 504. The temporary sixty-four bit data word 504 can be input to the counting module to obtain a leading zeros count or a leading ones count as described herein.

Figure 6:
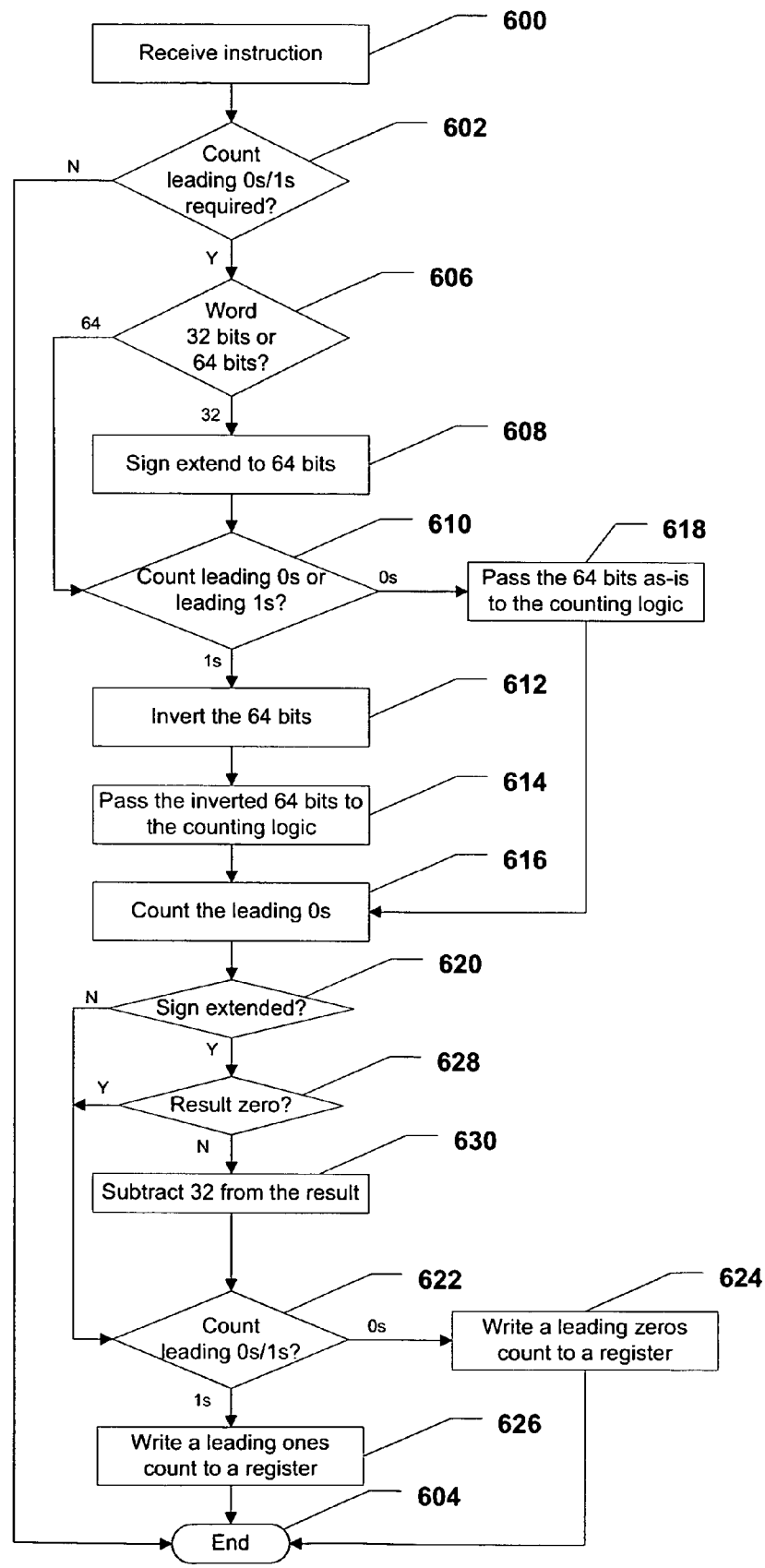
FIG. 6 is a flow chart illustrating a method of counting leading zeros and counting leading ones within sixty-four bit data words and thirty-two bit data words.

FIG. 6 illustrates an exemplary, non-limiting method of counting leading zeros and counting leading ones. Commencing at block 600, the instruction execution unit receives a word associated with an instruction. At block 602, the instruction execution unit, e.g., a control module within the instruction execution unit, determines whether a leading zeros count or leading ones count of the word is required by the associated instruction. If a leading zeros count or a leading ones count is not required, the method ends at state 604. On the other hand, if a leading zeros count or a leading ones count is required, the method proceeds to decision step 606.

At decision step 606, the control module determines whether the word is thirty bits long or sixty-four bits long. If the word is thirty-two bits long, the method proceeds to block 608 and a sign extender sign extends the thirty-two bit data word to create a temporary sixty-four bit data word. Thereafter, the method moves to decision step 610. Returning to decision step 604, if the word is sixty-four bits, the method proceeds directly to decision step 610.

At decision step 610, the control module determines whether a leading zeros count or a leading ones count is required for the sixty-four bit data word or the temporary sixty-four bit data word. If a leading ones count is required, the method proceeds to block 612 and an inverter inverts the sixty-four bit data word or the temporary sixty-four bit data word to create an inverted sixty-four bit data word or an inverted temporary sixty-four bit data word. Moving to block 614, the inverter passes the inverted sixty-four bit data word or the inverted temporary sixty-four bit data word to the counting module. At block 616, the counting module counts the leading zeros of the inverted sixty-four bit data word or the inverted temporary sixty-four bit data word to obtain an interim result.

Returning to decision step 610, if a leading zeros count is required, the method proceeds to block 618 and the control module passes the sixty-four bit data word or the temporary sixty-four bit data word to the counting module. Thereafter, the method moves to block 616 and the counting module counts the leading zeros of the sixty-four bit data word or the temporary sixty-four bit data word to obtain an interim result. From block 616, the method continues to decision step 620 and the control module determines whether the sixty-four bit data word that is the subject of the count was previously sign extended. If not, the method proceeds to decision step 622 and the control module determines whether the count is a leading zeros count or a leading ones count. If the count is a leading zeros count, the method proceeds to block 624 and the control module writes a leading zeros count to a register. The method then ends at state 604. Conversely, at decision step 622, if the count is a leading ones count, the method proceeds to block 626 and the control module writes a leading ones count to a register. The method then ends at state 604.

Returning to decision step 620, if the sixty-four bit data word that is the subject of the count was previously sign extended, the method continues to decision step 628. At decision step 628, the control module determines whether the result of the count is zero. If so, the method moves to decision step 622 and continues as described herein. On the other hand, if the result is not zero, the method proceeds to block 630 and a fixed value of thirty-two is subtracted from the interim result to yield a final result. Thereafter, the method continues to decision step 622 and continues as described herein.

Figure 7:
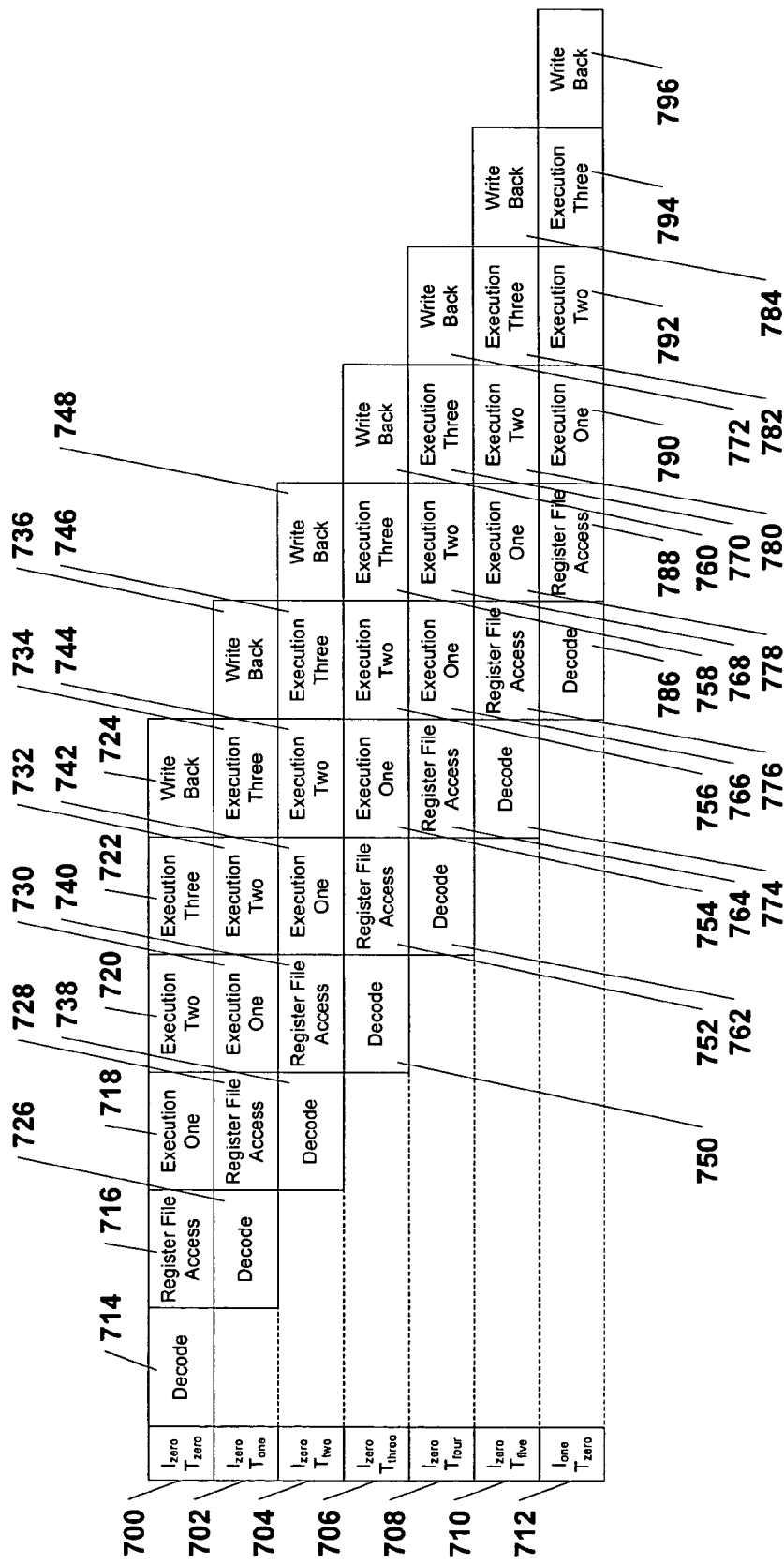
FIG. 7 is a diagram illustrating a detailed interleaved multithreading operation of the digital signal processor shown in FIG. 1.

Referring to FIG. 7, a detailed method of interleaved multithreading for a digital signal processor is shown. FIG. 7 shows that the method includes a branch routine 700, a load routine 702, a store routine 704, and an s-pipe routine 706. Each routine 700, 702, 704, 706 includes a plurality of steps that are performed during six clock cycles for each instruction fetched from an instruction queue by a sequencer. In a particular embodiment, the clock cycles include a decode clock cycle 708, a register file access clock cycle 710, a first execution clock cycle 712, a second execution clock cycle 714, a third execution clock cycle 716, and a writeback clock cycle 718. Further, each clock cycle includes a first portion and a second portion.

FIG. 7 shows that during the branch routine 700, at block 720, a quick decode for the instruction is performed within a sequencer during a first portion of the decode clock cycle. At block 722, during the second portion of the decode clock cycle 708, the sequencer accesses a register file, e.g., starts a register file access for a first operand. The register access of block 722 finishes within the register file access clock cycle 710 and the first operand is retrieved from the register file. In a particular embodiment, the sequencer accesses the register file via a first data read port. As shown, the register file access of block 722 occurs during the second portion of the decode clock cycle 708 and the first portion of the register file access clock cycle 710. As such, the register file access overlaps the decode clock cycle 708 and the register file access clock cycle 710.

At block 724, also during the decode clock cycle 708, the sequencer begins a full decode for the instruction. The full decode performed by the sequencer occurs within the second portion of the decode clock cycle 708 and the first portion of the register file access clock cycle 710.

During the register file access clock cycle 710, at block 726, the sequencer generates an instruction virtual address (IVA). Thereafter, at block 728, the sequencer performs a page check in order to determine the physical address page associated with a virtual address page number. Moving to the first execution clock cycle 712, at block 730, the sequencer performs an instruction queue lookup. At block 732, the sequencer accesses an instruction cache a first time and retrieves a first double-word for the instruction. In a particular embodiment, each instruction includes three double-words, e.g., a first double-word, a second double-word, and a third double-word. At block 734, during the first execution clock cycle 712, the sequencer aligns the double-word coming from the instruction cache.

Continuing to the second execution clock cycle 714, the sequencer accesses the instruction cache a second time in order to retrieve the second double-word for the instruction at block 736. Next, at block 738, the sequencer aligns the double-word retrieved from the instruction cache.

Proceeding to the third execution clock cycle 716, the sequencer accesses the instruction cache a third time in order to retrieve a third double-word at block 742. After the sequencer accesses the instruction cache the third time, the sequencer aligns the third double-word, at block 744.

As illustrated in FIG. 7, during the load routine 702, at block 750, the sequencer performs a quick decode for the instruction during the first portion of the decode clock cycle 708. At block 752, during the second portion of the decode clock cycle 708, the sequencer begins a register file access. As shown, the second register access by the sequencer spans two clock cycles, i.e., including the second portion of the decode clock cycle 708 and the first portion of register file access clock cycle 710. As such, the register file access ends within the register file access clock cycle 710 and a second operand can be retrieved. Next, during the first execution cycle 712, at block 754, an address generation unit within a first instruction execution unit generates a first virtual address for the instruction based on the previously read register file content.

At block 756, during the second execution clock cycle 714, a data translation look-aside buffer (DTLB) performs an address translation for the first virtual address in order to generate a first physical address. Still within the second execution clock cycle 714, at block 758, the sequencer performs a tag check.

Moving to the third execution cycle 716, the sequencer accesses a data cache static random access memory (SRAM) in order to read data out of the SRAM, at block 760. Also, within the third execution cycle, at block 762, the sequencer updates the register file associated with the instruction a first time via a first data write port. In a particular embodiment, the sequencer updates the register with file the results of a post increment address. Next, during the writeback clock cycle 718, at block 764 a load aligner shifts data to align the data within the double-word. At block 766, also within the writeback clock cycle 718, the sequencer updates the register file for the instruction a second time via the first data write port with data loaded from the cache.

FIG. 7 shows that during the store routine 704, at block 768, the sequencer performs a quick decode for the instruction during the decode clock cycle 708. Further, during the decode clock cycle 708, at block 770, the sequencer accesses a register file associated with the instruction a third time via a third data read port. The register access of block 770 occurs within the last portion of the decode clock cycle 708 and the first portion of the register file access clock cycle 710. As such, the register file begins within the decode clock cycle 708 and ends within the register file access clock cycle 710. In a particular embodiment, a third operand is retrieved from the register file during the register file access clock cycle 710.

As depicted in FIG. 7, during the second portion of the register file access clock cycle 710, the sequencer access the register file for the instruction a fourth time via the third data read port at block 772. The fourth register file commences within the register file access clock cycle 710 and ends within the first execution clock cycle 712 wherein a fourth operand is retrieved from the register. In a particular embodiment, the third data read port is used to access the register in order to retrieve the third operand and the fourth operand. At block 774, a portion of the data from the sequencer is multiplexed at a multiplexer. Also, during the first execution clock cycle 712, at block 776, a second address generation unit within a second instruction execution unit generates a virtual address for the instruction based on the previously read data from the register file.

Proceeding to the second execution clock cycle 714, during the store routine, at block 778, the data translation look-aside buffer (DTLB) translates the previously generated virtual address for the instruction into a physical address. At block 780, within the second execution clock cycle 714, the sequencer performs a tag check. Also, during the second execution clock cycle 714, at block 782, a store aligner aligns a store data to the appropriate byte, half-word, or word boundary within a double-word before writing the data to the data cache. Moving to the third execution clock cycle 716, at block 784, the sequencer updates the data cache static random access memory. Then, at block 786, the sequencer updates the register file for the instruction a third time via a second data write port with the results of executing the instruction during the third execution clock cycle 716.

As illustrated in FIG. 7, the s-pipe routine 706 begins during the decode clock cycle 708, at block 788, where a quick decode is performed for the instruction. At block 790, the sequencer accesses the register file for the instruction a fifth time via a fourth data read port. The fifth register file access also spans two clock cycles and begins within the second portion of the decode clock cycle 708 and ends within the first portion of the register file access clock cycle 710 wherein a fifth operand is retrieved. Still during the register file access clock cycle 710, a portion of the data from the register file for the instruction is multiplexed at a multiplexer. Also, during the register file access clock cycle 710, the sequencer accesses the register file for the instruction a sixth time via the fourth data read port at block 794. The sixth access to the register file begins within the second portion of the register file access clock cycle 710 and ends within the first portion of the first execution clock cycle 712. A sixth operand is retrieved during the first execution clock cycle 712.

Proceeding to the second execution clock cycle 714, at block 796, data retrieved during the fifth register file access and the sixth register file access is sent to a 64-bit shifter, a vector unit, and a sign/zero extender. Also, during the first execution clock cycle, at block 798, the data from the shifter, the vector unit, and the sign/zero extender is multiplexed.

Moving to the second execution clock cycle 714, the multiplexed data from the shifter, the vector unit, and the sign/zero extender is sent to an arithmetic logic unit, a count leading zeros unit, or a comparator at block 800. At block 802, the data from the arithmetic logic unit, the count leading zeros unit, and the comparator is multiplexed at a single multiplexer. After the data is multiplexed, the shifter shifts the multiplexed data in order to multiply the data by 2, 4, 8, etc. at block 804 during the third execution clock cycle 716. Then, at block 806, the output of the shifter is saturated. During the writeback clock cycle 718, at block 808, the register file for the instruction is updated a fourth time via a third write data port.

In a particular embodiment, as illustrated in FIG. 7, the method of interleaved multithreading for the digital signal processor utilizes four read ports for each register and three write ports for each register. Due to recycling of read ports and write ports, six operands can be retrieved via the four read data ports. Further, four results can be updated to the register file via three write data ports.

Figure 8:
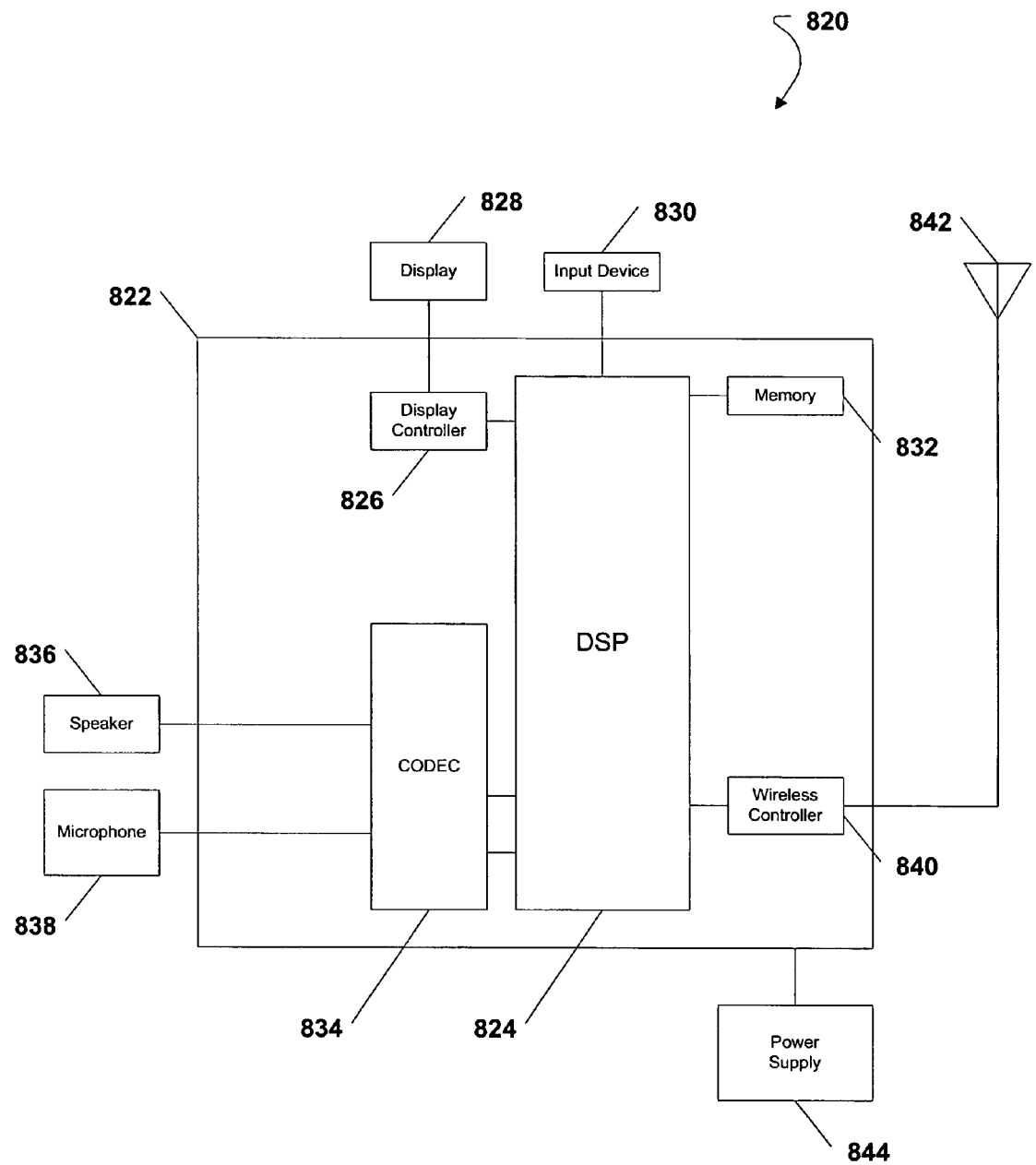
FIG. 8 is a general diagram of a portable communication device incorporating a digital signal processor.

FIG. 8 illustrates an exemplary, non-limiting embodiment of a portable communication device that is generally designated 820. As illustrated in FIG. 8, the portable communication device includes an on-chip system 822 that includes a digital signal processor 824. In a particular embodiment, the digital signal processor 824 is the digital signal processor shown in FIG. 1 and described herein. FIG. 8 also shows a display controller 826 that is coupled to the digital signal processor 824 and a display 828. Moreover, an input device 830 is coupled to the digital signal processor 824. As shown, a memory 832 is coupled to the digital signal processor 824. Additionally, a coder/decoder (CODEC) 834 can be coupled to the digital signal processor 824. A speaker 836 and a microphone 838 can be coupled to the CODEC 834.

FIG. 8 also indicates that a wireless controller 840 can be coupled to the digital signal processor 824 and a wireless antenna 842. In a particular embodiment, a power supply 844 is coupled to the on-chip system 822. Moreover, in a particular embodiment, as illustrated in FIG. 8, the display 828, the input device 830, the speaker 836, the microphone 838, the wireless antenna 842, and the power supply 844 are external to the on-chip system 822. However, each is coupled to a component of the on-chip system 822.

In a particular embodiment, the digital signal processor 824 utilizes interleaved multithreading to process instructions associated with program threads necessary to perform the functionality and operations needed by the various components of the portable communication device 820. For example, when a wireless communication session is established via the wireless antenna a user can speak into the microphone 838. Electronic signals representing the user's voice can be sent to the CODEC 834 to be encoded. The digital signal processor 824 can perform data processing for the CODEC 834 to encode the electronic signals from the microphone. Further, incoming signals received via the wireless antenna 842 can be sent to the CODEC 834 by the wireless controller 840 to be decoded and sent to the speaker 836. The digital signal processor 824 can also perform the data processing for the CODEC 834 when decoding the signal received via the wireless antenna 842.

Further, before, during, or after the wireless communication session, the digital signal processor 824 can process inputs that are received from the input device 830. For example, during the wireless communication session, a user may be using the input device 830 and the display 828 to surf the Internet via a web browser that is embedded within the memory 832 of the portable communication device 820. The digital signal processor 824 can interleave various program threads that are used by the input device 830, the display controller 826, the display 828, the CODEC 834 and the wireless controller 840, as described herein, to efficiently control the operation of the portable communication device 820 and the various components therein. Many of the instructions associated with the various program threads are executed concurrently during one or more clock cycles. As such, the power and energy consumption due to wasted clock cycles is substantially decreased.

Figure 9:
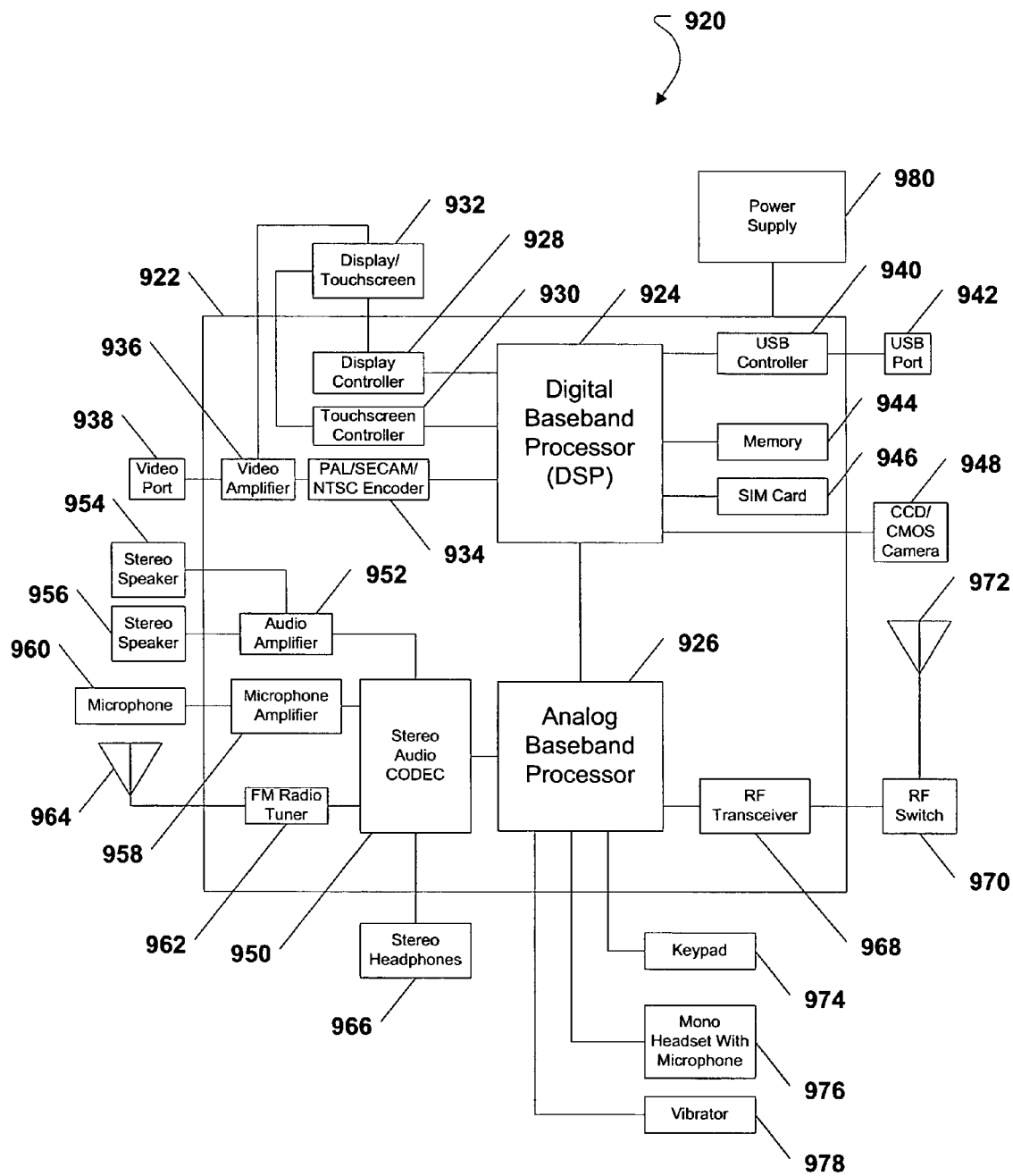
FIG. 9 is a general diagram of an exemplary cellular telephone incorporating a digital signal processor.

Referring to FIG. 9, an exemplary, non-limiting embodiment of a cellular telephone is shown and is generally designated 920. As shown, the cellular telephone 920 includes an on-chip system 922 that includes a digital baseband processor 924 and an analog baseband processor 926 that are coupled together. In a particular embodiment, the digital baseband processor 924 is a digital signal processor, e.g., the digital signal processor shown in FIG. 1 and described herein. Further, in a particular embodiment, the analog baseband processor 926 can also be a digital signal processor, e.g., the digital signal processor shown in FIG. 1. As illustrated in FIG. 9, a display controller 928 and a touchscreen controller 930 are coupled to the digital baseband processor 924. In turn, a touchscreen display 932 external to the on-chip system 922 is coupled to the display controller 928 and the touchscreen controller 930.

FIG. 9 further indicates that a video encoder 934, e.g., a phase alternating line (PAL) encoder, a sequential couleur a memoire (SECAM) encoder, or a national television system(s) committee (NTSC) encoder, is coupled to the digital baseband processor 924. Further, a video amplifier 936 is coupled to the video encoder 934 and the touchscreen display 932. Also, a video port 938 is coupled to the video amplifier 936. As depicted in FIG. 9, a universal serial bus (USB) controller 940 is coupled to the digital baseband processor 924. Also, a USB port 942 is coupled to the USB controller 940. A memory 944 and a subscriber identity module (SIM) card 946 can also be coupled to the digital baseband processor 924. Further, as shown in FIG. 9, a digital camera 948 can be coupled to the digital baseband processor 924. In an exemplary embodiment, the digital camera 948 is a charge-coupled device (CCD) camera or a complementary metal-oxide semiconductor (CMOS) camera.

As further illustrated in FIG. 9, a stereo audio CODEC 950 can be coupled to the analog baseband processor 926. Moreover, an audio amplifier 952 can coupled to the to the stereo audio CODEC 950. In an exemplary embodiment, a first stereo speaker 954 and a second stereo speaker 956 are coupled to the audio amplifier 952. FIG. 9 shows that a microphone amplifier 958 can be also coupled to the stereo audio CODEC 950. Additionally, a microphone 960 can be coupled to the microphone amplifier 958. In a particular embodiment, a frequency modulation (FM) radio tuner 962 can be coupled to the stereo audio CODEC 950. Also, an FM antenna 964 is coupled to the FM radio tuner 962. Further, stereo headphones 966 can be coupled to the stereo audio CODEC 950.

FIG. 9 further indicates that a radio frequency (RF) transceiver 968 can be coupled to the analog baseband processor 926. An RF switch 970 can be coupled to the RF transceiver 968 and an RF antenna 972. As shown in FIG. 9, a keypad 974 can be coupled to the analog baseband processor 926. Also, a mono headset with a microphone 976 can be coupled to the analog baseband processor 926. Further, a vibrator device 978 can be coupled to the analog baseband processor 926. FIG. 9 also shows that a power supply 980 can be coupled to the on-chip system 922. In a particular embodiment, the power supply 980 is a direct current (DC) power supply that provides power to the various components of the cellular telephone 920 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 9, the touchscreen display 932, the video port 938, the USB port 942, the camera 948, the first stereo speaker 954, the second stereo speaker 956, the microphone 960, the FM antenna 964, the stereo headphones 966, the RF switch 970, the RF antenna 972, the keypad 974, the mono headset 976, the vibrator 978, and the power supply 980 are external to the on-chip system 922. Moreover, in a particular embodiment, the digital baseband processor 924 and the analog baseband processor can use interleaved multithreading, described herein, in order to process the various program threads associated with one or more of the different components associated with the cellular telephone 920.

Figure 10:
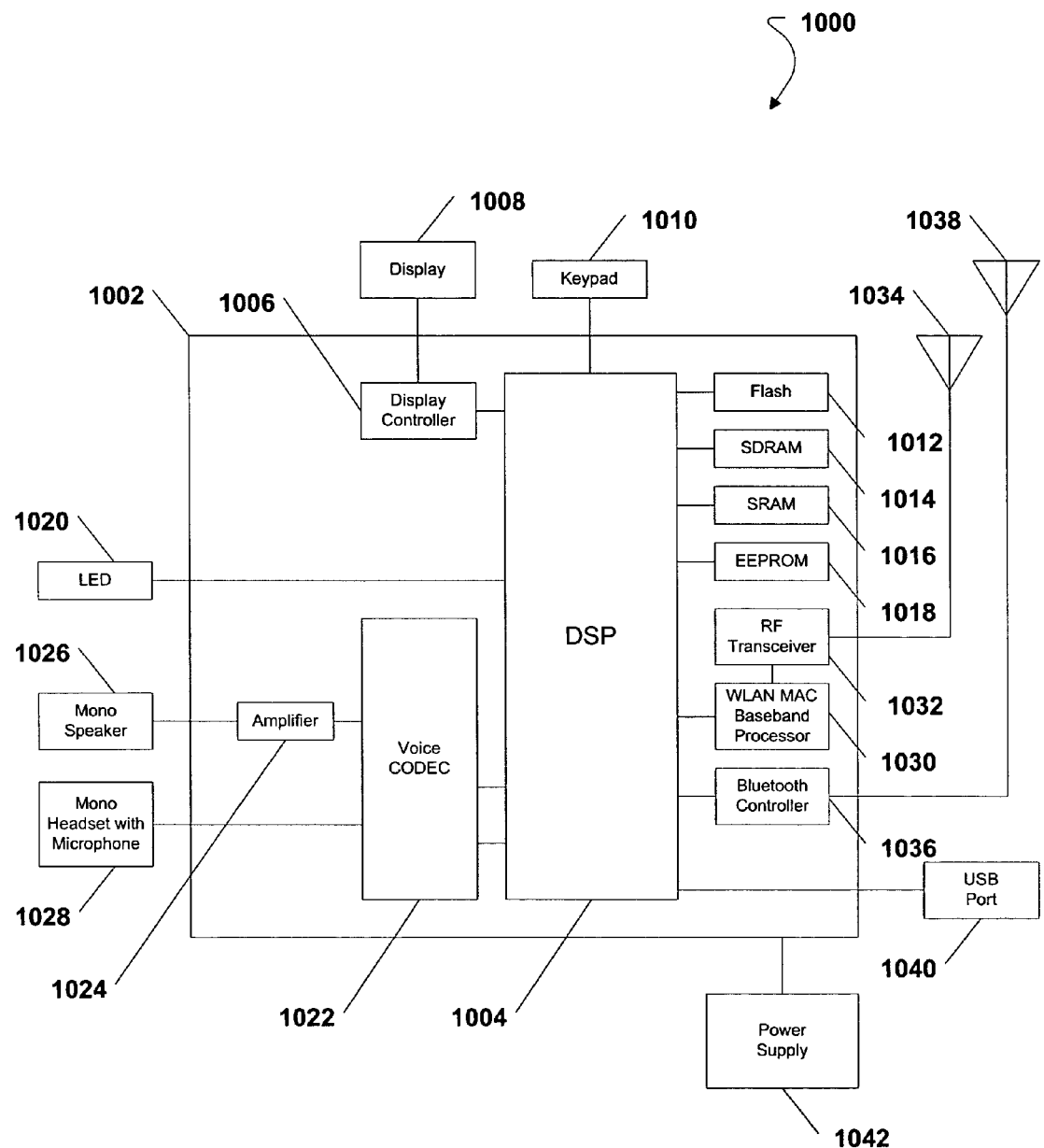
FIG. 10 is a general diagram of an exemplary wireless Internet Protocol telephone incorporating a digital signal processor.

Referring to FIG. 10, an exemplary, non-limiting embodiment of a wireless Internet protocol (IP) telephone is shown and is generally designated 1000. As shown, the wireless IP telephone 1000 includes an on-chip system 1002 that includes a digital signal processor (DSP) 1004. In a particular embodiment, the DSP 1004 is the digital signal processor shown in FIG. 1 and described herein. As illustrated in FIG. 10, a display controller 1006 is coupled to the DSP 1004 and a display 1008 is coupled to the display controller 1006. In an exemplary embodiment, the display 1008 is a liquid crystal display (LCD). FIG. 10 further shows that a keypad 1010 can be coupled to the DSP 1004.

As further depicted in FIG. 10, a flash memory 1012 can be coupled to the DSP 1004. A synchronous dynamic random access memory (SDRAM) 1014, a static random access memory (SRAM) 1016, and an electrically erasable programmable read only memory (EEPROM) 1018 can also be coupled to the DSP 1004. FIG. 10 also shows that a light emitting diode (LED) 1020 can be coupled to the DSP 1004. Additionally, in a particular embodiment, a voice CODEC 1022 can be coupled to the DSP 1004. An amplifier 1024 can be coupled to the voice CODEC 1022 and a mono speaker 1026 can be coupled to the amplifier 1024. FIG. 10 further indicates that a mono headset 1028 can also be coupled to the voice CODEC 1022. In a particular embodiment, the mono headset 1028 includes a microphone.

FIG. 10 also illustrates that a wireless local area network (WLAN) baseband processor 1030 can be coupled to the DSP 1004. An RF transceiver 1032 can be coupled to the WLAN baseband processor 1030 and an RF antenna 1034 can be coupled to the RF transceiver 1032. In a particular embodiment, a Bluetooth controller 1036 can also be coupled to the DSP 1004 and a Bluetooth antenna 1038 can be coupled to the controller 1036. FIG. 10 also shows that a USB port 1040 can also be coupled to the DSP 1004. Moreover, a power supply 1042 is coupled to the on-chip system 1002 and provides power to the various components of the wireless IP telephone 1000 via the on-chip system 1002.

In a particular embodiment, as indicated in FIG. 10, the display 1008, the keypad 1010, the LED 1020, the mono speaker 1026, the mono headset 1028, the RF antenna 1034, the Bluetooth antenna 1038, the USB port 1040, and the power supply 1042 are external to the on-chip system 1002. However, each of these components is coupled to one or more components of the on-chip system. Further, in a particular embodiment, the digital signal processor 1004 can use interleaved multithreading, as described herein, in order to process the various program threads associated with one or more of the different components associated with the EP telephone 1000.

Figure 11:
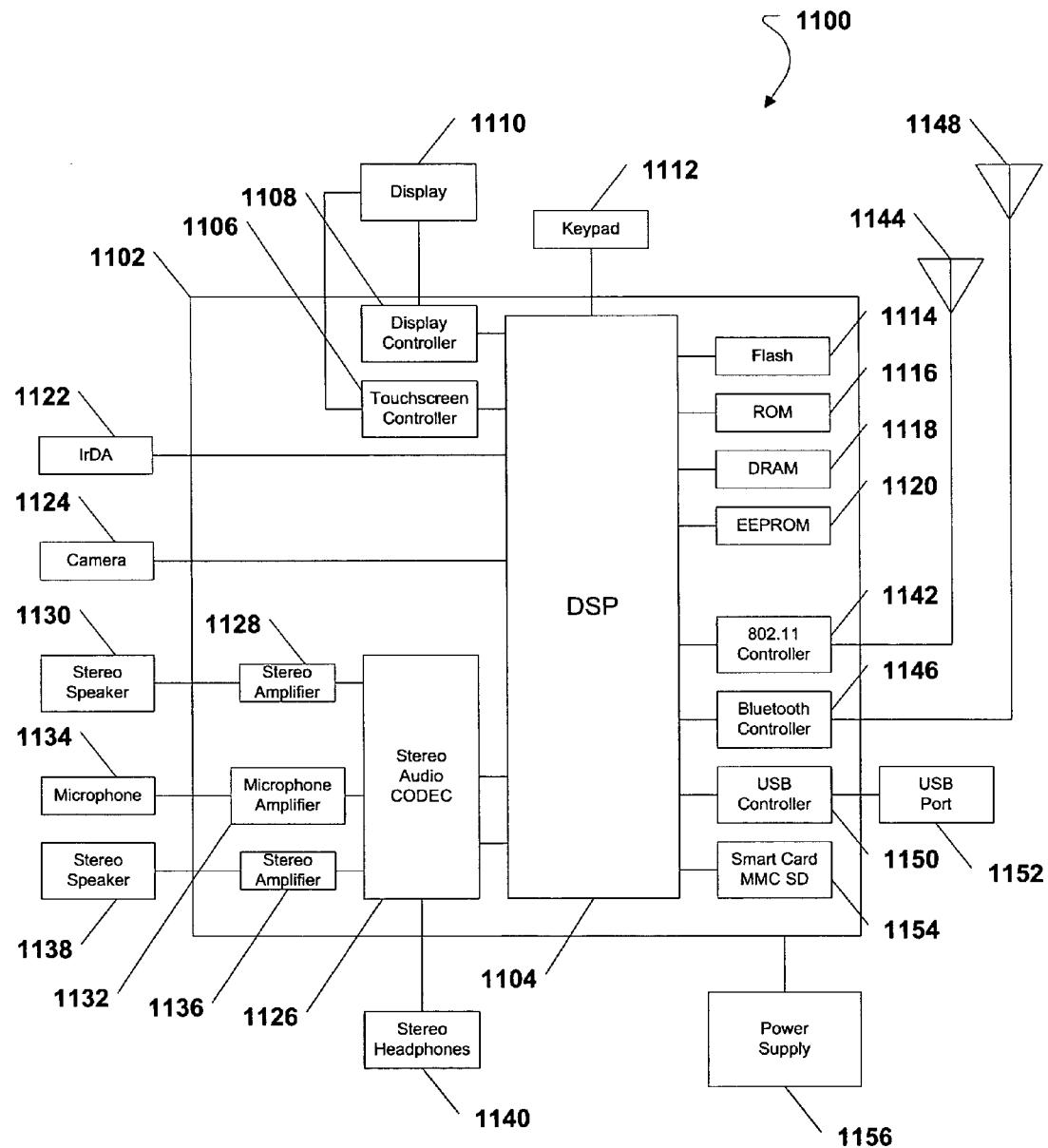
FIG. 11 is a general diagram of an exemplary portable digital assistant incorporating a digital signal processor.

FIG. 11 illustrates an exemplary, non-limiting embodiment of a portable digital assistant (PDA) that is generally designated 1100. As shown, the PDA 1100 includes an on-chip system 1102 that includes a digital signal processor (DSP) 1104. In a particular embodiment, the DSP 1104 is the digital signal processor shown in FIG. 1 and described herein. As depicted in FIG. 11, a touchscreen controller 1106 and a display controller 1108 are coupled to the DSP 1104. Further, a touchscreen display is coupled to the touchscreen controller 1106 and to the display controller 1108. FIG. 11 also indicates that a keypad 1112 can be coupled to the DSP 1104.

As further depicted in FIG. 11, a flash memory 1114 can be coupled to the DSP 1104. Also, a read only memory (ROM) 1116, a dynamic random access memory (DRAM) 1118, and an electrically erasable programmable read only memory (EEPROM) 1120 can be coupled to the DSP 1104. FIG. 11 also shows that an infrared data association (IrDA) port 1122 can be coupled to the DSP 1104. Additionally, in a particular embodiment, a digital camera 1124 can be coupled to the DSP 1104.

As shown in FIG. 11, in a particular embodiment, a stereo audio CODEC 1126 can be coupled to the DSP 1104. A first stereo amplifier 1128 can be coupled to the stereo audio CODEC 1126 and a first stereo speaker 1130 can be coupled to the first stereo amplifier 1128. Additionally, a microphone amplifier 1132 can be coupled to the stereo audio CODEC 1126 and a microphone 1134 can be coupled to the microphone amplifier 1132. FIG. 11 further shows that a second stereo amplifier 1136 can be coupled to the stereo audio CODEC 1126 and a second stereo speaker 1138 can be coupled to the second stereo amplifier 1136. In a particular embodiment, stereo headphones 1140 can also be coupled to the stereo audio CODEC 1126.

FIG. 11 also illustrates that an 802.11 controller 1142 can be coupled to the DSP 1104 and an 802.11 antenna 1144 can be coupled to the 802.11 controller 1142. Moreover, a Bluetooth controller 1146 can be coupled to the DSP 1104 and a Bluetooth antenna 1148 can be coupled to the Bluetooth controller 1146. As depicted in FIG. 11, a USB controller 1150 can be coupled to the DSP 1104 and a USB port 1152 can be coupled to the USB controller 1150. Additionally, a smart card 1154, e.g., a multimedia card (MMC) or a secure digital card (SD) can be coupled to the DSP 1104. Further, as shown in FIG. 11, a power supply 1156 can be coupled to the on-chip system 1102 and can provide power to the various components of the PDA 1100 via the on-chip system 1102.

In a particular embodiment, as indicated in FIG. 11, the display 1110, the keypad 1112, the IrDA port 1122, the digital camera 1124, the first stereo speaker 1130, the microphone 1134, the second stereo speaker 1138, the stereo headphones 1140, the 802.11 antenna 1144, the Bluetooth antenna 1148, the USB port 1152, and the power supply 1150 are external to the on-chip system 1102. However, each of these components is coupled to one or more components on the on-chip system. Additionally, in a particular embodiment, the digital signal processor 1104 can use interleaved multithreading, described herein, in order to process the various program threads associated with one or more of the different components associated with the portable digital assistant 1100.

Figure 12:
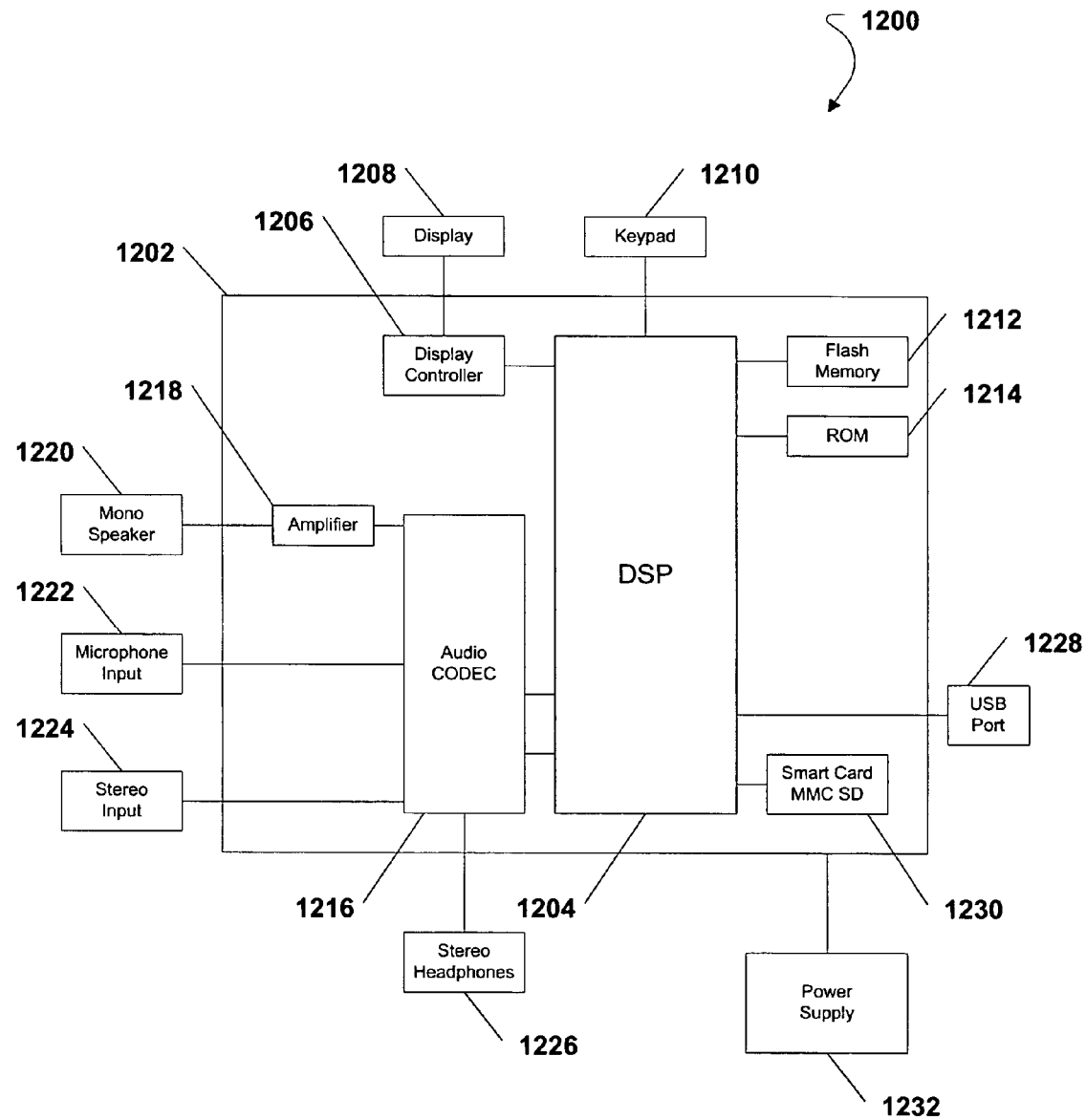
FIG. 12 is a general diagram of an exemplary audio file player incorporating a digital signal processor.

Referring to FIG. 12, an exemplary, non-limiting embodiment of an audio file player, such as moving pictures experts group audio layer-3 (MP3) player is shown and is generally designated 1200. As shown, the audio file player 1200 includes an on-chip system 1202 that includes a digital signal processor (DSP) 1204. In a particular embodiment, the DSP 1204 is the digital signal processor shown in FIG. 1 and described herein. As illustrated in FIG. 12, a display controller 1206 is coupled to the DSP 1204 and a display 1208 is coupled to the display controller 1206. In an exemplary embodiment, the display 1208 is a liquid crystal display (LCD). FIG. 12 further shows that a keypad 1210 can be coupled to the DSP 1204.

As further depicted in FIG. 12, a flash memory 1212 and a read only memory (ROM) 1214 can be coupled to the DSP 1204. Additionally, in a particular embodiment, an audio CODEC 1216 can be coupled to the DSP 1204. An amplifier 1218 can be coupled to the audio CODEC 1216 and a mono speaker 1220 can be coupled to the amplifier 1218. FIG. 12 further indicates that a microphone input 1222 and a stereo input 1224 can also be coupled to the audio CODEC 1216. In a particular embodiment, stereo headphones 1226 can also be coupled to the audio CODEC 1216.

FIG. 12 also indicates that a USB port 1228 and a smart card 1230 can be coupled to the DSP 1204. Additionally, a power supply 1232 can be coupled to the on-chip system 1202 and can provide power to the various components of the audio file player 1200 via the on-chip system 1202.

In a particular embodiment, as indicated in FIG. 12, the display 1208, the keypad 1210, the mono speaker 1220, the microphone input 1222, the stereo input 1224, the stereo headphones 1226, the USB port 1228, and the power supply 1232 are external to the on-chip system 1202. However, each of these components is coupled to one or more components on the on-chip system. Also, in a particular embodiment, the digital signal processor 1204 can use interleaved multithreading, described herein, in order to process the various program threads associated with one or more of the different components associated with the audio file player 1200.

With the configuration of structure disclosed herein, the system and method described herein provides a way to count leading zeros and to count leading ones within sixty-four bit data words and thirty-bit data words using the same hardware within a digital signal processor. As such, the need for different sets of hardware to count leading zeros and leading ones within different sized data words is obviated.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method of processing a data word, the method comprising:
   receiving the data word;
   determining whether the data word has a first width or a second width, the second width greater than the first width;
   after determining that the data word has the first width, sign extending the data word to create a data word having the second width; and
   subtracting a value from an interim count of leading data bits of the data word having the second width to determine a final count of leading data bits.

2. The method of claim 1, further comprising counting leading zeros or leading ones within the data word having the second width to obtain the interim count of leading data bits.

3. The method of claim 1, wherein the final count of leading data bits is a final count of leading ones or leading zeros.

4. The method of claim 1, wherein the first width is thirty-two bits and the second width is sixty-four bits, wherein the interim count indicates leading zeros, and wherein the value is a fixed value that is subtracted from the interim count, provided the interim count is not zero.

5. The method of claim 4, further comprising writing the final count to a register.

6. The method of claim 4, wherein the fixed value is thirty-two.

7. The method of claim 1, further comprising inverting the data word having the second width to create an inverted data word having the second width when a leading ones value is to be determined.

8. The method of claim 7, further comprising communicating the inverted data word having the second width to a bit counter that has the second width.

9. The method of claim 1, wherein the first width is thirty-two bits and the second width is sixty-four bits, wherein the interim count indicates leading ones, and further comprising subtracting the fixed value of thirty-two from the interim count, provided the interim count is not zero.

10. The method of claim 9, further comprising writing the final count to a register.

11. The method of claim 1, further comprising determining whether a leading zeros value or a leading ones value is to be used, after determining that the data word has the second width.

12. The method of claim 11, further comprising:
   communicating the data word to a bit counter having the second width after determining that the leading zeros value is to be used.

13. The method of claim 11, further comprising:
   inverting the data word having the second width to create an inverted data word when a leading ones value is to be used; and
   communicating the inverted data word to a sixty-four bit counter.

14. A method comprising:
   using a sixty-four bit logic counter to count zero or more leading zeros within a thirty-two bit data word;
   sign extending the thirty-two bit data word to create a sixty-four bit data word;
   counting the leading zeros within the sixty-four bit data word to obtain an interim result; and
   subtracting a fixed value from the interim result, provided the count of the leading zeros is not zero, to obtain a final result.

15. The method of claim 14, further comprising writing the final result to a register as a leading zeros value.

16. The method of claim 14, further comprising:
   receiving a second thirty-two bit data word;
   sign extending the second thirty-two bit data word to create a second sixty-four bit data word; and
   inverting the second sixty-four bit data word to generate an inverted sixty-four bit data word.

17. The method of claim 16, further comprising counting the leading zeros of the inverted sixty-four bit data word to obtain a second interim result.

18. The method of claim 17, further comprising subtracting the fixed value from the second interim result, provided the count of the leading zeros of the inverted sixty-four bit data word is not zero, to obtain a second final result.

19. The method of claim 18, wherein the fixed value is thirty-two.

20. The method of claim 19, further comprising writing the second final result to a register as a leading ones value.

21. An instruction execution unit for a digital signal processor, the instruction execution unit, comprising:
a control module;
a sign extender coupled to the control module;
at least one inverter coupled to the control module; and
a sixty-four bit wide bit counter coupled to the control module, wherein the control module includes:
logic to instruct the sixty-four bit wide bit counter to count leading zeros within one or more thirty-two bit data words received at the instruction execution unit;
logic to instruct the sixty-four bit wide bit counter to count leading zeros within one or more sixty-four bit data words received at the instruction execution unit;
logic to control the sign extender to sign extend the one or more thirty-two bit data words to create a temporary sixty-four bit data word;
logic to instruct the sixty-four bit wide bit counter to count the leading zeros within the temporary sixty-four bit data word to obtain an interim leading zeros count; and
logic to subtract a fixed value from the interim leading zeros count, provided the interim leading zeros count is not zero, to obtain a final leading zeros count.

22. The instruction execution unit of claim 21, wherein the control module further comprises logic to control the inverter to invert the temporary sixty-four bit data word to yield an inverted temporary sixty-four bit data word.

23. The instruction execution unit of claim 22, wherein the control module further comprises logic to instruct the sixty-four bit wide bit counter to count the leading zeros of the inverted temporary sixty-four bit data word to obtain an interim leading ones count.

24. The instruction execution unit of claim 23, wherein the control module further comprises logic to subtract a fixed value from the interim leading ones count, provided the count of the leading zeros of the inverted temporary sixty-four bit data word is not zero, to obtain a final leading ones count.

25. A portable communication device, comprising:
a digital signal processor, wherein the digital signal processor comprises:
a memory;
a sequencer responsive to the memory;
a register file coupled to the memory;
an instruction execution unit responsive to the sequencer, wherein the instruction execution unit comprises:
a control module;
a sign extender coupled to the control module;
an inverter coupled to the control module; and
a sixty-four bit wide bit counter coupled to the control module, wherein the control module includes:
logic to control the sixty-four bit wide bit counter to count leading zeros within one or more thirty-two bit data words; and
logic to control the sixty-four bit wide bit counter to count leading zeros within one or more sixty-four bit data words;
a baseband processor coupled to the digital signal processor;
a coder/decoder (CODEC) coupled to the baseband processor;
a radio frequency (RF) transceiver coupled to the baseband processor; and
an antenna coupled to the RF transceiver.

26. The portable communication device of claim 25, wherein the baseband processor includes an analog baseband processor, wherein the CODEC includes a stereo audio CODEC, and wherein the antenna is coupled to the RF transceiver via an RF switch.

27. The portable communication device of claim 25, wherein the CODEC includes a voice CODEC, wherein the baseband processor includes a wireless local area network media access control (WLAN MAC) baseband processor, and further comprising:
a Bluetooth controller coupled to the digital signal processor; and
a Bluetooth antenna coupled to the Bluetooth controller.

28. The portable communication device of claim 25, wherein the CODEC includes a stereo CODEC and further comprising:
an 802.11 controller coupled to the digital signal processor;
an 802.11 antenna coupled to the 802.11 controller;
a Bluetooth controller coupled to the digital signal processor;
a Bluetooth antenna coupled to the Bluetooth controller;
a universal serial bus (USB) controller coupled to the digital signal processor; and
a USB port coupled to the USB controller.

29. A processor device, comprising:
means for receiving a thirty-two bit data word;
means for sign extending the thirty-two bit data word to create a temporary sixty-four bit data word;
means for counting the leading zeros within the temporary sixty-four bit data word to obtain an interim leading zeros count; and
means for subtracting a value from the interim leading zeros count, provided the count is not zero, to obtain a final leading zeros count.

30. A processor device, comprising:
means for receiving a thirty-two bit data word;
means for sign extending the thirty-two bit data word to create a temporary sixty-four bit data word;
means for inverting the temporary sixty-four bit data word to create an inverted temporary sixty-four bit data word;
means for counting the leading zeros within the temporary sixty-four bit data word to obtain an interim leading ones count; and
means for subtracting a value from the interim leading ones count, provided the count is not zero, to obtain a final leading ones count.

31. A method of processing a data word, comprising:
receiving a data word having a width of 2 to the Nth power;
sign extending the data word to a temporary data word having a width of 2 to the Mth power;
inputting the temporary data word to a counter having a width of 2 to the Mth power;
counting the leading zeros within the temporary data word to produce a temporary result; and
subtracting a value equal to 2 to the Mth power minus 2 to the Nth power from the temporary result to determine a count.

32. The method of claim 31, further comprising setting the count equal to zero when the temporary result is zero.

33. The method of claim 31, wherein the temporary result has M+1 bits, and wherein the temporary result includes a bit zero as a least significant bit, a bit M as a most significant bit, and a bit N between the bit zero and the bit M.

34. The method of claim 33, further comprising:
copying bit M to the location of bit N; and
replacing bit M through bit N+1 with zero.

35. A processor device, comprising:
means for receiving a data word having a width of 2 to the Nth power;
means for sign extending the data word to a temporary data word having a width of 2 to the Mth power;
means for inputting the temporary data word to a counter having a width of 2 to the Mth power;
means for counting the leading zeros within the temporary data word to produce a temporary result; and
means for subtracting a value equal to 2 to the Mth power minus 2 to the Nth power from the temporary result to produce a count.

36. The device of claim 35, further comprising means for setting the count equal to zero when the temporary result is zero.

37. The device of claim 35, wherein the temporary result has M+1 bits, and wherein the temporary result includes a bit zero as a least significant bit, a bit M as a most significant bit, and a bit N between the bit zero and the bit M.

38. The device of claim 37, further comprising:
means for copying bit M to the location of bit N; and
means for replacing bit M through bit N+1 with zero.

39. An audio file player, comprising:
a digital signal processor;
an audio coder/decoder (CODEC) coupled to the digital signal processor;
a multimedia card coupled to the digital signal processor;
a universal serial bus (USB) port coupled to the digital signal processor; and
wherein the digital signal processor includes:
a memory;
a sequencer responsive to the memory;
a register file coupled to the memory;
an instruction execution unit responsive to the sequencer, wherein the instruction execution unit comprises:
a control module;
a sign extender coupled to the control module;
an inverter coupled to the control module; and
a sixty-four bit wide bit counter coupled to the control module, wherein the control module includes:
logic to control the sixty-four bit wide bit counter to count leading zeros within one or more thirty-two bit data words; and
logic to control the sixty-four bit wide bit counter to count leading zeros within one or more sixty-four bit data words.

* * * * *

UNITED STATES PATENT AND TRADEMARK OFFICE
CERTIFICATE OF CORRECTION

PATENT NO. : 7,584,233 B2 Page 1 of 1
APPLICATION NO. : 11/170288
DATED : September 1, 2009
INVENTOR(S) : Koob et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

Signed and Sealed this

Fourteenth Day of September, 2010

David J. Kappos
*Director of the United States Patent and Trademark Office*